United States Patent [19]
Magnusson

[11] Patent Number: 5,978,165
[45] Date of Patent: *Nov. 2, 1999

[54] METHOD OF DETERMINING AXIAL OFFSET DISTANCE IN HELICAL SCAN TAPE DRIVE

[75] Inventor: Steven L. Magnusson, Boulder, Colo.

[73] Assignee: Exabyte Corporation, Boulder, Colo.

[*] Notice: This patent issued on a continued prosecution application filed under 37 CFR 1.53(d), and is subject to the twenty year patent term provisions of 35 U.S.C. 154(a)(2).

[21] Appl. No.: 08/825,295

[22] Filed: Mar. 27, 1997

[51] Int. Cl.$^6$ .................................................. G11B 5/02
[52] U.S. Cl. ...................... 360/73.04; 360/77.13
[58] Field of Search .................. 360/27, 77.13, 360/73.04, 18, 69, 25, 31, 75

[56] References Cited

U.S. PATENT DOCUMENTS

| | | |
|---|---|---|
| 4,843,495 | 6/1989 | Georgis et al. . |
| 4,845,577 | 7/1989 | Georgis et al. . |
| 4,868,692 | 9/1989 | Nakase et al. ................. 360/77.13 |
| 5,050,018 | 9/1991 | Georgis et al. . |
| 5,068,757 | 11/1991 | Hughes et al. ................. 360/77.13 |
| 5,124,853 | 6/1992 | Kashida et al. ................. 360/18 |
| 5,146,373 | 9/1992 | Wakui et al. .................. 360/73.07 |
| 5,212,603 | 5/1993 | Hasegawa ...................... 360/18 |
| 5,243,473 | 9/1993 | Lee ............................ 360/69 |
| 5,291,134 | 3/1994 | Magnusson . |
| 5,535,068 | 7/1996 | Hughes . |
| 5,602,694 | 2/1997 | Miles et al. . |
| 5,731,921 | 3/1998 | Hughes et al. ................. 360/27 |

FOREIGN PATENT DOCUMENTS

| | | |
|---|---|---|
| WO 95/13606 | 5/1985 | WIPO . |
| WO 95/13615 | 5/1985 | WIPO . |

Primary Examiner—Nabil Hindi
Attorney, Agent, or Firm—Nixon & Vanderhye, P.C.

[57] ABSTRACT

A method of determining a vertical (e.g., axial) offset distance between a first and a second transducing element of a helical scan tape drive involves varying a ratio of a rotational velocity of the drum to a linear tape speed of the tape while transducing a magnetic pattern between at least one of the transducing elements and the tape. The pattern transduced is read and used to determine information pertaining to the vertical offset distance. In one mode of the invention, a vertical offset distance between a read transducing element and a write transducing element is determined by using a peak magnitude of a read signal. In a second mode of the invention, the linear tape speed is first set to a value at which tracks recorded by a second write transducing element are rendered unreadable, and a resultant noise signal acquired. Then the linear tape speed is slowly varied through a range of values to obtain a value at which tracks recorded by the second write transducing element are not rendered unreadable, and thereat a non-noise signal acquired. A threshold linear tape speed at which the non-noise signal begins is used to determine the vertical offset distance between the first and second write transducing elements.

2 Claims, 9 Drawing Sheets

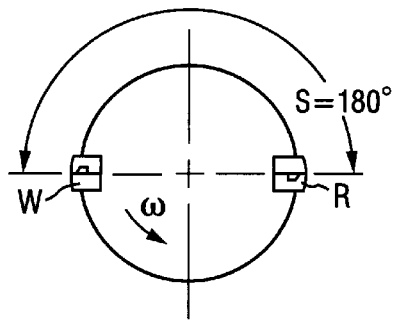
Fig. 2A
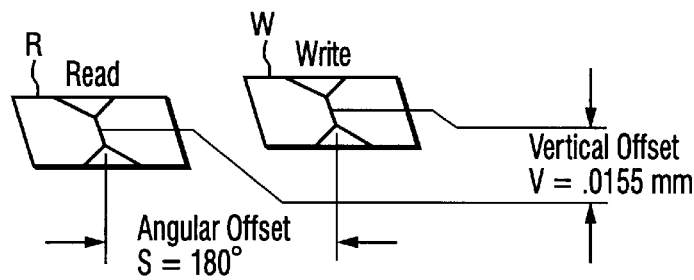
Fig. 2B
Fig. 3
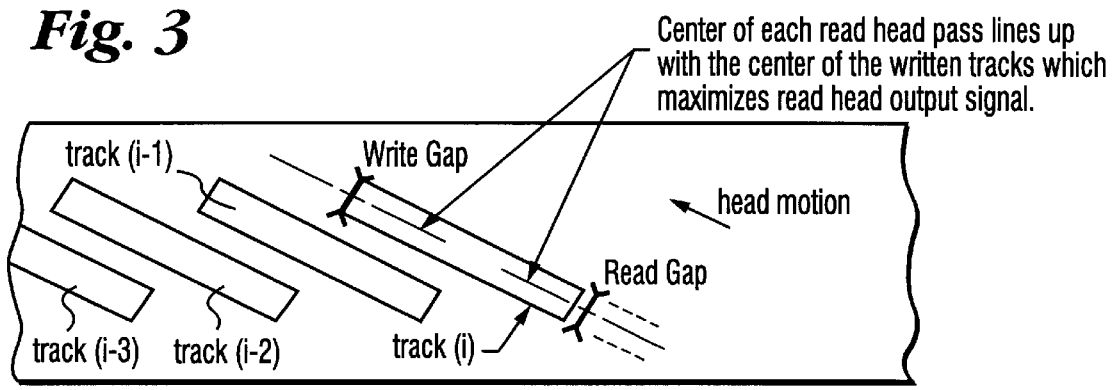
Center of each read head pass lines up with the center of the written tracks which maximizes read head output signal.
Fig. 4
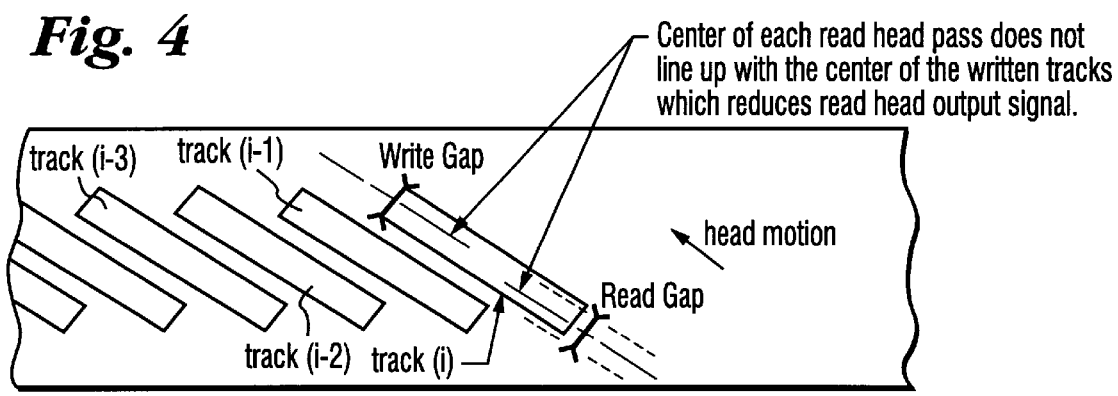
Center of each read head pass does not line up with the center of the written tracks which reduces read head output signal.

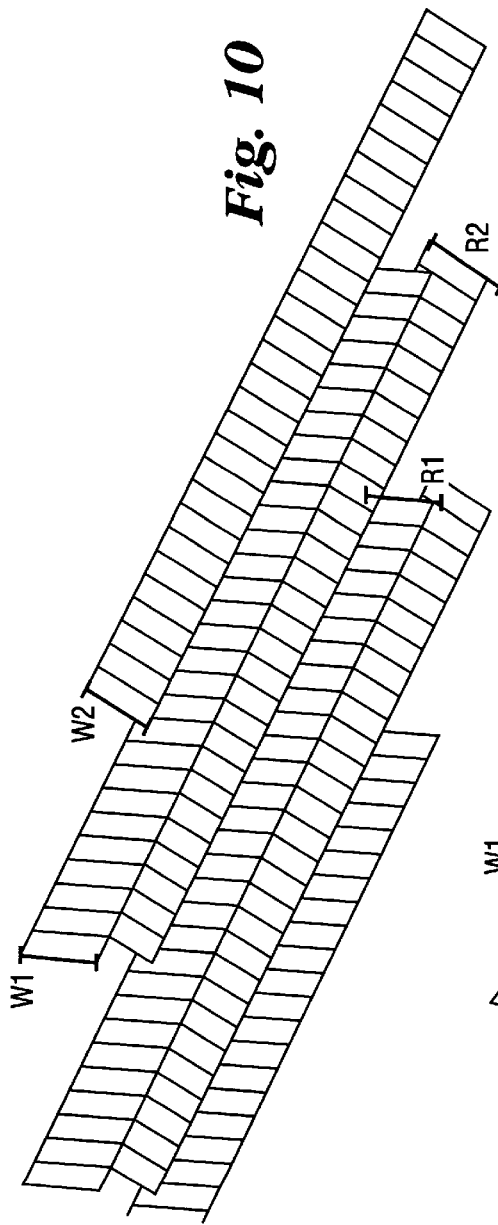
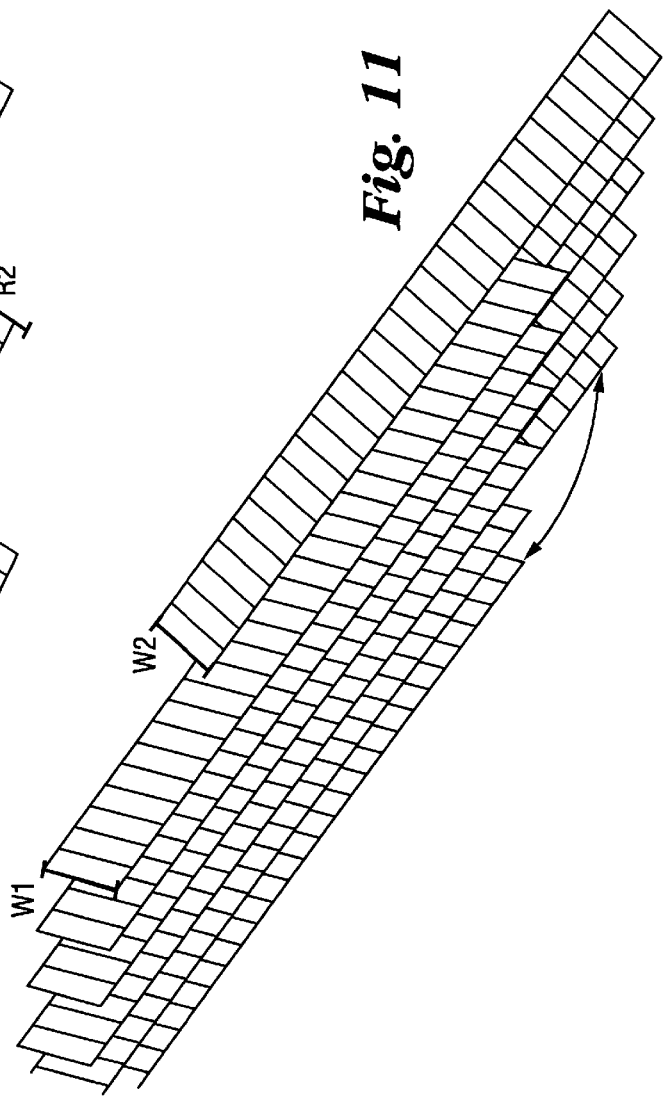

METHOD OF DETERMINING AXIAL OFFSET DISTANCE IN HELICAL SCAN TAPE DRIVE

BACKGROUND

1. Field of Invention

This invention pertains to rotating drums which have magnetic heads mounted thereon and which are used in helical scan tape drives, and particularly to a method for determining and verifying parameters of such drums.

2. Related Art and Other Considerations

In a helical scan tape drive, traveling magnetic tape is at least partially wrapped around a rotating drum (or scanner) so that heads mounted on the drum can transduce information to and from the tape in a format of helical stripes. The drum has at least one write or recording head mounted thereon, and also at least one read head.

On a drum of a helical scan drive, one head is distanced from another head both by a radial distance and an axial distance. The axial distance is taken along the major axis of the drum, the radial distance is an angle about the major axis of the drum. The separation of two heads along the major axis of the drum is herein denoted as the "vertical offset distance" or "VOD", or alternatively as the "axial offset distance" or "AOD".

In the manufacturing of a drum for a helical scan recorder, it is desired that the axial offset distance be properly set. Historically, drum or scanner manufacturers have used high-power optical microscope measurement systems to adjust and verify the spatial alignment of the heads of a drum during production. This optical technique has several disadvantages which have become more significant as track densities have increased.

A first disadvantage stems from the fact that the optical measurements used to establish the spatial head positions are made from the physical edges of the magnetic materials that form a front gap area of each head. This measurement is actually an approximation since the effective "magnetic" edges of the head gap (which interact with the magnetic media either writing or reading) do not necessarily coincide with the physical material edges on the tape- rubbing surface of the head. The difference between the physical and magnetic edges are typically small, on the order of 1 $\mu$m, which could be ignored at low track densities. However, as track densities have now increased to greater than 80 tracks/mm, the head spatial positioning errors due to the difference between the physical edges and the magnetic edges can be significant (~10% of track pitch) and thus cannot be ignored.

As a second disadvantage, the spatial optical measurements are made with the drum held stationary, i.e., the drum is not rotating. However, the high-speed dynamic head plane of the scanner (as used during writing or reading) may differ from the low-speed static head plane (as measured optically). Although the differences between the high-speed dynamic and low-speed static head planes are also small (on the order of 0.5 $\mu$m), as track widths narrow (e.g., approach 10 $\mu$m or less) the difference becomes a more significant factor.

As a third disadvantage, interactions of very small imperfections in the scanner spindle components (for example, the ball-bearing defects) cause a non-repetitive head plane error (a.k.a. non-repetitive runout or NRR) that can be accounted for only if many (say several hundred) measurements are averaged. This is not practical for the optical measurement technique (for even relatively low- volume production) since each complete optical measurement of a multi-headed scanner might take several minutes. Accordingly, drum manufacturers have historically ignored NRR.

A fourth manufacturing disadvantage for the optical measurement technique is that such optical measurements are only practical with the drum removed from the tape drive and placed in special tooling. This means that the spatial head positions cannot be verified easily as a routine part of final tape drive testing.

U.S. Pat. No. 5,291,134 to Magnusson, incorporated herein by reference, describes an electrical measurement technique that can be used to determine and/or adjust the location of the magnetic flux emanating from the erase head gaps of a scanner relative to the magnetic pattern previously recorded by the write (or "record") head gaps of the scanner. The method described in U.S. Pat. No. 5,291,134 is only a relative technique in that it merely determines how a second magnetic flux pattern from the erase head gaps interacts with a first magnetic pattern previously recorded by the write head gaps. The method of U.S. Pat. No. 5,291,134 gives no absolute information about the first magnetic pattern recorded by the write head gaps. Moreover, in the technique described by U.S. Pat. No. 5,291,134, both the first magnetic pattern from the write head gaps and the second magnetic pattern from the erase head gaps are recorded with a constant (native) ratio between the scanner RPM and the linear tape speed.

U.S. Pat. No. 5,731,921 to by Hughes, entitled "Method and Apparatus For Determining And Using Head Parameters In A Helical Scan Recorder", incorporated herein by reference, provides methods of determining an axial offset variance (AOV) of a write head with respect to a read head. The axial offset variance is a differential between a desired (e.g., specification mandated) axial offset distance and an actual axial offset distance by which the heads are actually separated on the drum. The methods disclosed in U.S. patent application Ser. No. 08/561,155 for determining axial offset variance involve transporting the tape past the drum at a constant linear velocity.

What is needed therefore, and an object of the present invention, is a non-microscopic technique for properly determining the axial offset distance between two heads on a rotating drum of a helical scan tape drive.

SUMMARY

In order to determine a proper axial or vertical offset distance between transducing elements mounted on a drum of a helical scan tape drive, a ratio of the drum rotational speed to a linear tape speed is varied while writing and/or reading a magnetic pattern. For any segmented, rotary head scanning device, changing the ratio of the drum RPM to the linear tape speed changes the pattern of write head gap paths and the pattern of read head gap paths. It also changes the relationship between these two patterns. The changes in the write head gap pattern creates changes in the recorded track pattern, and the changes in the read head gap pattern (both its form and its position relative to the recorded track pattern) results in variation of the overlap of the read head gaps over the recorded track pattern. Consequently, this changes the readback signal waveforms. From knowing how the drum RPM/linear tape speed ratio was varied and by measuring the resultant changes in the readback signal waveform(s), important spatial information about the write head gap and read head gap locations is deduced.

In order to vary the drum RPM/linear tape speed ratio it is more practical to change only the linear tape speed rather than the scanner RPM. However, either or both factors can be modified to produce different ratios. Additionally, for operation at each ratio, many readback measurements can be quickly obtained and averaged together so that NRR effects can be eliminated. Advantageously, the measurement is made with a dynamic rotating head plane rather than a static head plane and is easily performed on fully, or near-fully, assembled drives.

Two modes are discussed to illustrate how this method can be applied to determine: (1) a first mode for determining the spatial location of a read gap relative to the write gap(s), and (2) a first mode for determining the location of a write gap relative to other write gap(s) on the scanner. These are only illustrative examples, it being understood that the method can be applied to any rotary scanner with more than one head gap. Moreover, in these two modes the recording and the readback are done quasi-concurrently at each drum RPM/linear tape speed ratio. The method is not limited to these constraints and can applied more generally with the recording being done at various drum RPM/linear tape speed ratios (using the native or non-native write head gap activation sequence) and the readback could be a totally separate subsequent tape pass done at any other desired drum RPM/linear tape speed ratios.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 2A is a top view of a drum of a first type of helical scan tape drive.

FIG. 2B is a schematic view depicting a vertical or axial offset distance between gaps of a read head and a write head of the drum of FIG. 2A.

FIG. 3 is a plan view of a native track pattern recorded on tape by the first type of helical scan tape drive when the tape is transported at a native linear tape speed.

FIG. 4 is a plan view of a track pattern recorded on tape by the first type of helical scan tape drive when the tape is transported at a non-native linear tape speed.

FIG. 10 is a plan view of a native track pattern recorded on tape by the second type of helical scan tape drive when the tape is transported at a native linear tape speed.

FIG. 11 is a plan view of a track pattern recorded on tape by the second type of helical scan tape drive when the tape is transported significantly below ½ of the native linear tape speed.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
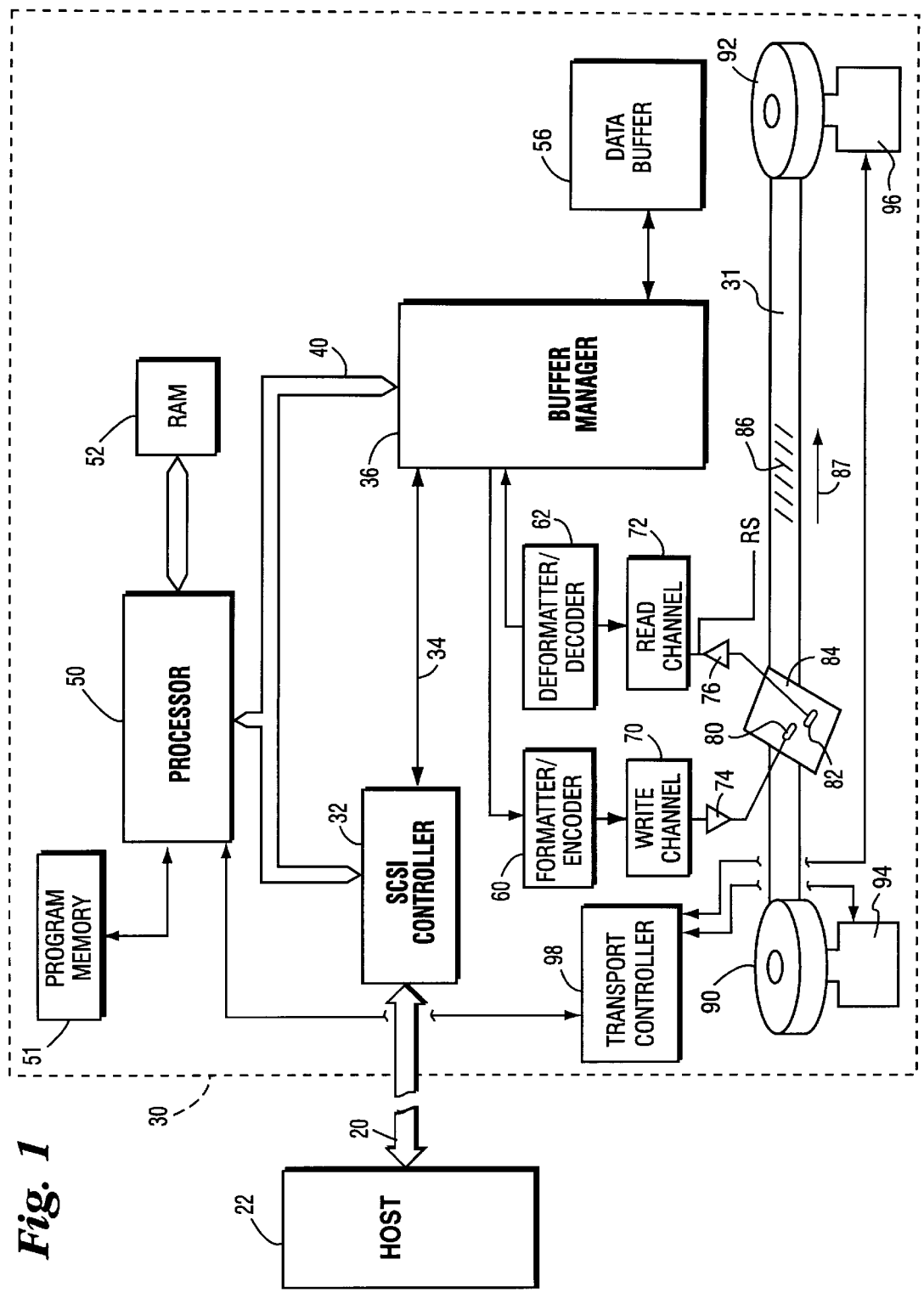
FIG. 1 is a schematic view of a tape drive according to the present invention, the tape drive being connected to a host.

FIG. 1 shows a SCSI bus 20 which connects a host computer 22 and a first embodiment of a SCSI target storage device, particularly tape drive 30. In the illustrated embodiment, tape drive 30 is shown as a generic helical scan tape drive which transduces information on/from tape 31. Tape drive 30 includes a SCSI controller 32 which is connected to SCSI bus 20. Data bus 34 connects SCSI controller 32 to buffer manager 36. Both SCSI controller 32 and buffer manager are connected by a bus system 40 to processor 50. Processor 50 is also connected to program memory 51 and to a data memory, particularly RAM 52.

Buffer manager 36 controls, e.g., both storage of user data in buffer memory 56 and retrieval of user data from buffer memory 56. User data is data from host 22 for recording on tape 31 or destined from tape 31 to host 22. Buffer manager 36 is also connected to formatter/encoder 60 and to deformatter/decoder 62. Formatter/encoder 60 and deformatter/decoder 62 are, in turn, respectively connected to write channel 70 and read channel 72. Write channel 70 is connected via write amplifier 74 to one or more recording element(s) or write head(s) 80; read channel is connected via read amplifier 76 to one or more read element(s) or read head(s) 82.

Those skilled in the art will appreciate that write channel 70 includes various circuits and elements including a RLL modulator, a parallel-to-serial converter, and write current modulator. Similarly, the person skilled in the art understands that read channel 72 includes a data pattern and clock recovery circuitry, a serial-to-parallel converter, and, an RLL demodulator. These and other aspects of tape drive 30, including servoing, error correction, are not necessary for an understanding of the invention and accordingly are not specifically described herein.

Write head(s) 80 and read head(s) 82 are situated on a peripheral surface of rotating drum 84. Tape 31 is wrapped around drum 84 such that head(s) 80 and 82 follow helical stripes 86 on tape 31 as tape 31 is transported in a direction indicated by arrow 87 from a supply reel 90 to a take-up reel 92. Supply reel 90 and take-up reel 92 are typically housed in an unillustrated cartridge or cassette from which tape 31 is extracted into a tape path that includes wrapping around drum 84.

The present invention is useful with numerous types of helical scan tape drives. For example, in one type of tape drive, tape 31 is transported by an unillustrated capstan which is rotated by a capstan motor. The drum has one write head and one read head, mounted 180 degrees apart on the periphery of the drum. In this type of tape drive, the capstan motor is controlled by transport controller 98, which ultimately is governed by processor 50. An example of this first type of tape drive is the EXB-8200 model tape drive manufactured by Exabyte Corporation, and which is illustrated e.g., in U.S. Pat. No. 4,843,495; U.S. Pat. No. 4,845,577; and U.S. Pat. No. 5,050,018, all of which are incorporated herein by reference.

A second type of tape drive with which the invention is useful is the Mammoth™ tape drive manufactured by Exabyte Corporation, and which is illustrated e.g., in U.S. Pat. No. 5,602,694, incorporated herein by reference. In this second type of type drive, two write heads and two read heads are mounted on the drum. A supply reel 90 and take-up reel 92 are driven by respective reel motors 94 and 96 to transport tape 31 in the direction 87. Reel motors 94 and 96 are driven by transport controller 98, which ultimately is governed by processor 50. Operation and control of the tape transport mechanism of this second type of tape drive including reel motors 94 and 96 is understood by the person skilled in the art with reference, for example, to U.S. patent application Ser. No. 08/337,620 for METHOD AND APPARATUS FOR CONTROLLING MEDIA LINEAR SPEED IN A HELICAL SCAN RECORDER, filed Nov. 10, 1994 and incorporated herein by reference.

The present invention is useful for determining the axial offset distance, i.e., the vertical offset distance, between transducing elements mounted on a drum of a helical scan tape drive. As used herein, "transducing element" includes a gap of a head mounted on the drum of a helical scan tape drive, and at times the term "gap" is used interchangeably with transducing element. A first mode of the invention, wherein the axial offset distance is determined between a read head and a write head, is described below in the context of the first type of helical scan tape drive discussed above. A second mode of the invention, wherein the axial offset distance is determined between two similar types of heads (e.g., two write heads), is described below in the context of the second type of helical scan tape drive discussed above.

OPERATION: FIRST MODE

In the first mode of the invention, the axial offset distance is determined between a read head and a write head. FIG. 2A shows a drum of the first type of tape drive mentioned above, specifically a drum having a sole write head W and a sole read head R. Heads W and R are separated by an angular offset S (see FIG. 2A), and by a vertical or axial offset distance V (see FIG. 2B). In the illustration, the nominal angular offset S is 180 degrees; the nominal vertical offset distance V is 0.0155 mm. The nominal angular offset S and the nominal vertical offset distance V of the read head gap relative to the write head gap are selected in combination with other factors so that when the write head gap is completing the recording of track I, the read head gap is very near the start of track I and the path of the read head gap is centered over the recorded track I (see FIG. 3) which maximizes the peak readback signal level. The readback signal RS is shown in FIG. 1 as being taken from read amplifier 76.

The other factors mentioned in the previous paragraph include the nominal effective drum diameter, the native drum revolution rate (RPM), the native linear tape speed, the nominal drum helix angle, the nominal write head gap width, and the nominal read head gap width. The native linear tape speed $V_T$ is 10.893 mm/sec.

As shown in FIG. 4, if the linear tape speed is decreased slightly from the native linear tape speed, the pitch between the recorded tracks decreases slightly and the read head path is no longer exactly centered over the recorded track i which reduces the level of the peak readback signal RS. The reduction occurs because the overlap of the read head and the recorded track is reduced. Similarly, if the linear tape speed is increased to be slightly above the native linear tape speed, the pitch between the recorded tracks increases slightly, and again the read head path is not exactly centered on track i which reduces the level of the peak readback signal.

Figure 5:
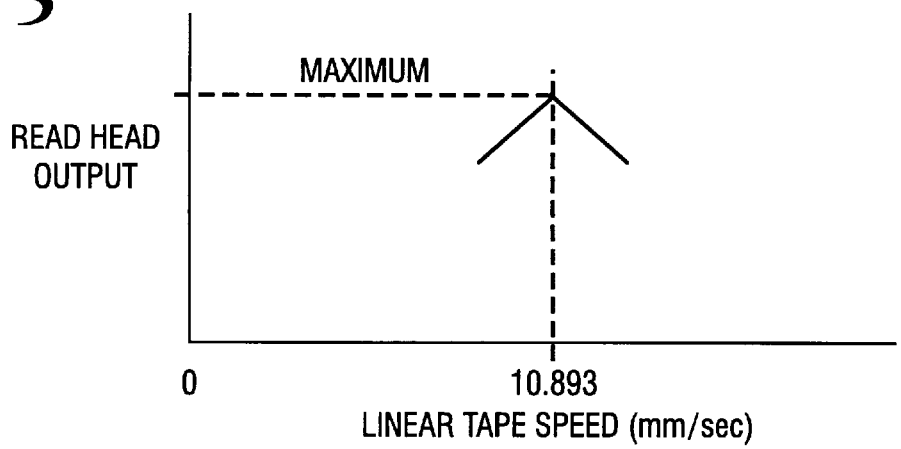
FIG. 5 is a graph showing amplitude of a read signal as a function of linear tape speed for the first type of tape drive, and wherein the maximum read head output signal occurs at a first linear tape speed value.
Figure 6:
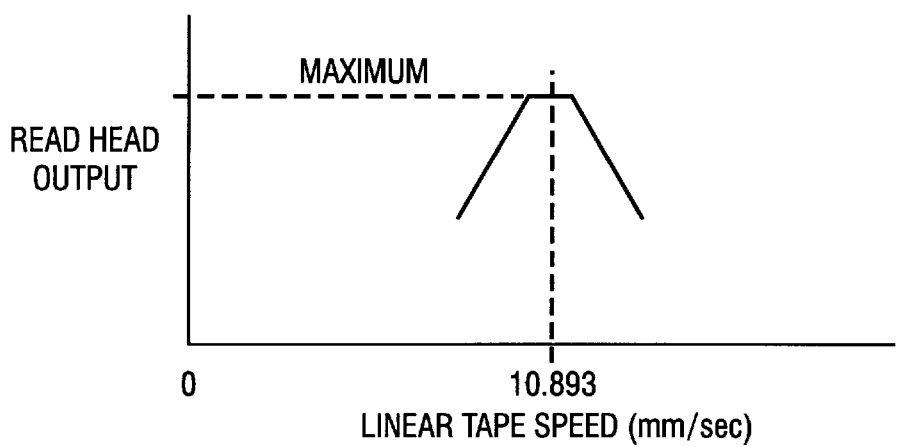
FIG. 6 is a graph showing amplitude of a read signal as a function of linear tape speed for the first type of tape drive, wherein the maximum read head output signal signal occurs at a first linear tape speed value, and wherein the width of a recorded track and the width of a read head gap are not be exactly equal.

When the readback signal RS is measured as a function of linear tape speed, the maximum peak readback signal occurs at the native linear tape speed (e.g., 10.893 mm/sec) if the read head gap is in its exact "nominal" location and all other factors are nominal (see FIG. 5). As it turns out in practice, sometimes the width of the recorded track and the width of the read head gap may not be exactly equal due to manufacturing tolerances which results in a "flat spot" in the readback signal waveform. However, the center of the "flat spot" is still located at the native linear tape speed (e.g., 10.893 mm/sec) if the read head gap is at its nominal spatial location (see FIG. 6).

Figure 7:
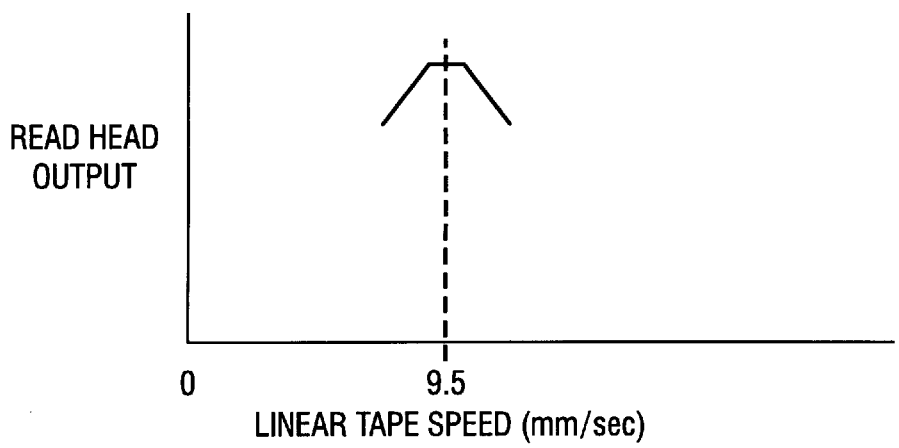
FIG. 7 is a graph showing amplitude of a read signal as a function of linear tape speed for the first type of tape drive, wherein the maximum read head output signal occurs at a second linear tape speed value, and wherein the width of a recorded track and the width of a read head gap are not be exactly equal.

Conversely, if the maximum readback signal (or, more correctly, the "center" of the maximum readback signal) does not occur at the native linear tape speed, such indicates that the read head gap is not at its nominal vertical offset distance (see FIG. 7).

Due to the very small difference between the drum helix angle and the recorded track angle, the location of the read head gap path is very insensitive to errors in the angular offset (S), but it is almost directly affected by errors in the vertical offset (V). Therefore, the error in the vertical offset dimension (V) can be estimated by determining the linear tape speed that produces the maximum readback signal amplitude (center).

Figure 8A:
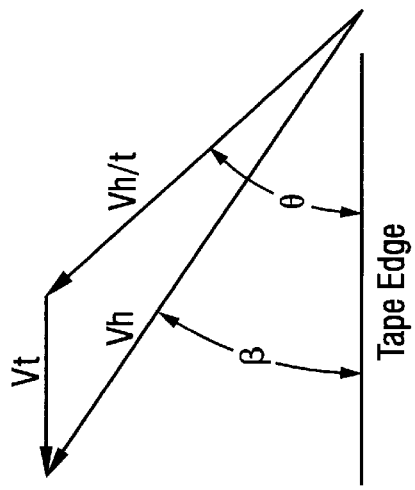
FIG. 8A is vector diagram showing derivation of a resultant angle between head-to-tape motion and tape edge for a first mode of the invention.

As an example of the foregoing, suppose that the maximum readback signal (center) occurs at 9.5 mm/sec rather than 10.893 mm/sec as shown in FIG. 7. The resulting direction of the head-to-tape motion (θ) with respect to tape edge is determined by Equation 1 and is as shown in FIG. 8A.

Equation 1

$$\theta = \tan^{-1}\left\{\frac{Vh\sin\beta}{Vh\cos\beta - Vt}\right\}$$

In Equation 1:
 Vh=head speed=πDN
  where
   D=Effective (Upper drum or headwheel) Diameter
  N=Drum rotational rate
  Vt=Linear tape speed
  β=Angle between the head plane and the tape edge
  Vh/t=Resultant head-to-tape speed
  θ=Resultant angle between the head-to-tape motion and the tape edge In the particular embodiment of the first tape drive herein illustrated, for the situation shown in FIG. 7 (in which Vt=9.5 mm/sec), D=40.003 mm; N=30 rev/sec; and β=4.885 degrees, resulting in a value of 4.897325084 degrees for the resulting direction of the head-to-tape motion with respect to tape edge, i.e., angle θ.

Figure 8B:
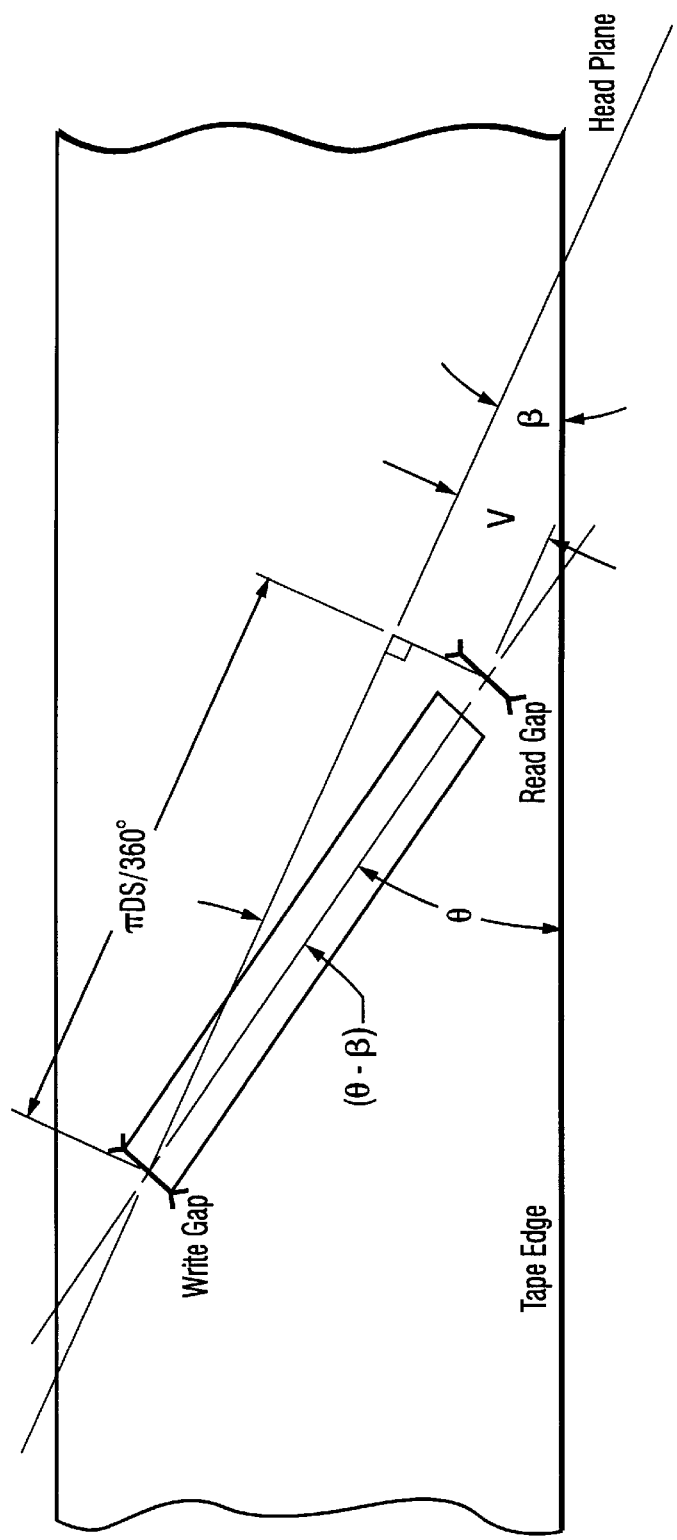
FIG. 8B diagram showing derivation of axial offset distance V for the first mode of the invention.

FIG. 8B shows the geometric relationship between the write head, the track written by the write head, and the read head that must exist to cause the maximum read head signal (center) to occur at Vt=9.5 mm/sec. FIG. 8B also shows parameters utilized to determine the axial offset distance V in accordance with Equation 2.

Equation 2

$$V = \{\pi DS^* \tan(\theta-\beta)\}/360°$$

With S (the angular separation between the heads) being 180° and the other parameters having the values provided above, it is seen that V=0.0135 mm.

Thus, for the case shown in FIG. 7, the actual vertical offset distance V is 0.0135 mm. Similarly, it can be shown that if the maximum readback signal (center) occurs at 12.3 mm, then V=0.0175 mm. Consequently, to verify that the value of V lies within the limits of V=0.0155±0.002 mm, the maximum readback signal (center) must occur at a linear tape speed between 9.5 and 12.3 mm/sec.

OPERATION: SECOND MODE

Figure 9A:
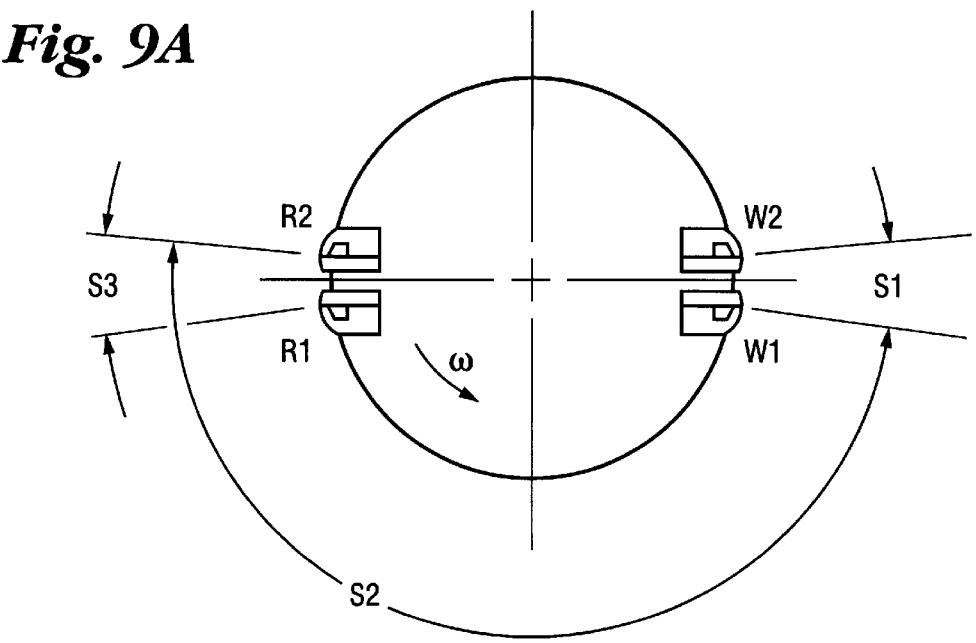
FIG. 9A is a top view of a drum of a second type of helical scan tape drive.
Figure 9B:
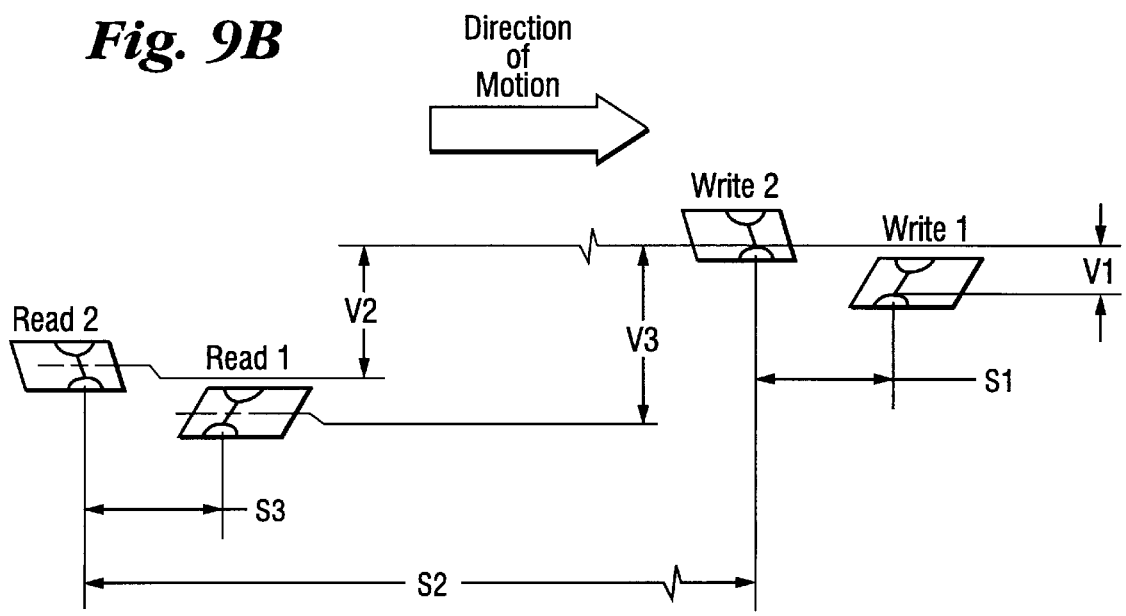
FIG. 9B is a schematic view depicting a vertical or axial offset distance between gaps of heads of the drum of FIG. 9A.

In the second mode of the invention, the axial offset distance is determined between a first write head and a second write head. FIG. 9 shows a drum of the second type of tape drive mentioned above, specifically a drum having one write combi-head pair and one read combi-head pair separated by approximately 180 degrees. A combi-head pair is two separate magnetic head gaps mounted close together. Thus, in the second type of helical scan type drive, it should be understood that write channel 70 is connected to two write gaps, and that read channel 72 is connected to two read gaps.

The nominal spatial positions (vertical V1 and angular S1) between the two write head gaps of the write combi-head are selected so that when the drum is rotated at its native +1× speed (5661.232 RPM) and the tape is moved at its native +1× linear speed (25.43 mm/sec) a uniform pattern of alternating azimuth tracks of 11.5 μm pitch is generated (see FIG. 10). The nominal spatial positions (vertical and angular) between each write head gap and its companion read head gap is selected so that under the same native +1× speeds as noted before the center of each read head gap follows the center of the track previously recorded by the appropriate write head gap. For one example of the second type of helical scan drive described above, the delay between writing a particular track and its recovery by the corresponding read head gap is selected to be 1.5 times the scanner rotational period (1.5×1/5661.232/60=15.8976 msec). As shown in FIG. 10, when operating at the native +1× speeds and the write combi-head pair is just completing the recording of track pair (i), the read combi-head pair is just starting to recover the signals recorded earlier in track pair (i−1).

If the linear tape speed is reduced to a value significantly below ½ of the native linear tape speed and the scanner spins at the native RPM, the tracks recorded by the W2 head gap are completely overlapped and obliterated by the tracks from the subsequent W1 head gap passes as shown in FIG. 11. As a result, none of the magnetic signal recorded by the W2 head gap remains (except for a small portion only at the very start of the tracks). Therefore, if this recording is readback by the R2 head gap [either (1) during the write process in a "read-after-write" operation, or (2) after rewinding the recording and then reading the recording at the same linear tape speed at which it was recorded] no signal output (except noise) will be recovered by the R2 head gap over the majority of each scan (see FIG. 11), ignoring the short bursts at the start of each track.

Figure 12:
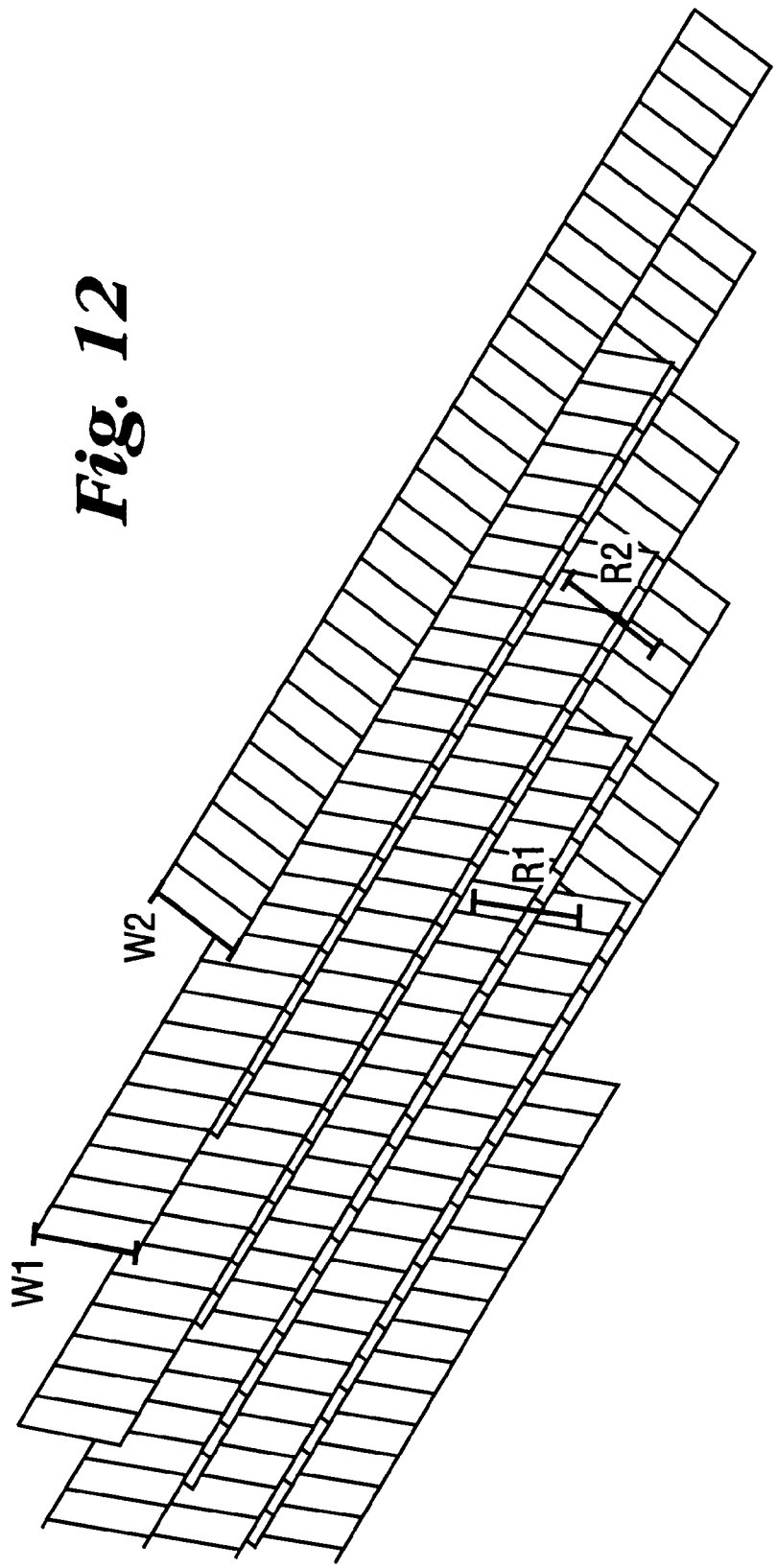
FIG. 12 is a plan view of a track pattern recorded on tape by the second type of helical scan tape drive when the tape is transported at a speed above ½ of the native linear tape speed sufficient to recover some signal from second tracks of the pattern.
Figure 13:
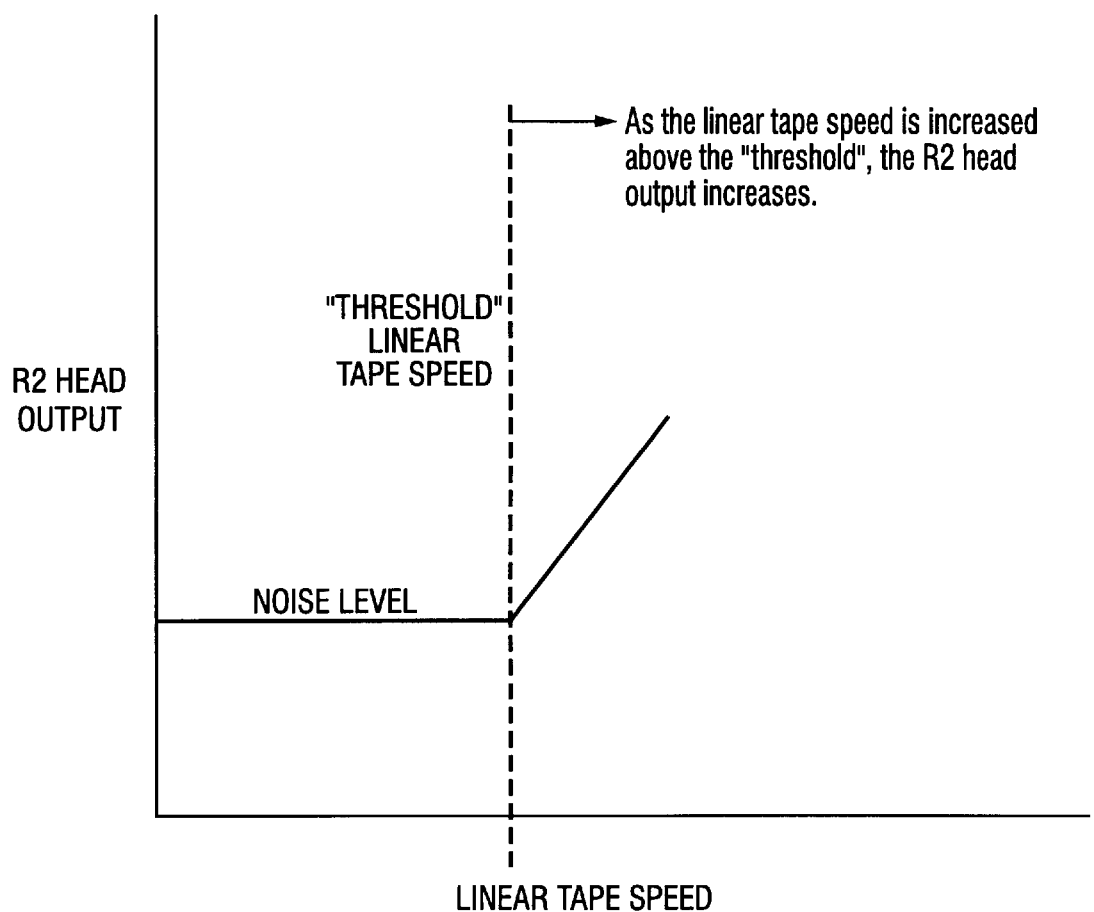
FIG. 13 is a graph showing amplitude of a read signal as a function of linear tape speed for the second type of tape drive.

If the linear tape speed is slowly increased, eventually the tracks recorded by the W2 head gap are not completely overwritten by the following W1 head passes, and the R2 head gap begins to recover some signal (see FIG. 12). The linear tape speed at which the R2 head output begins to increase is called the "threshold" linear tape speed (see FIG. 13).

Figure 14A:
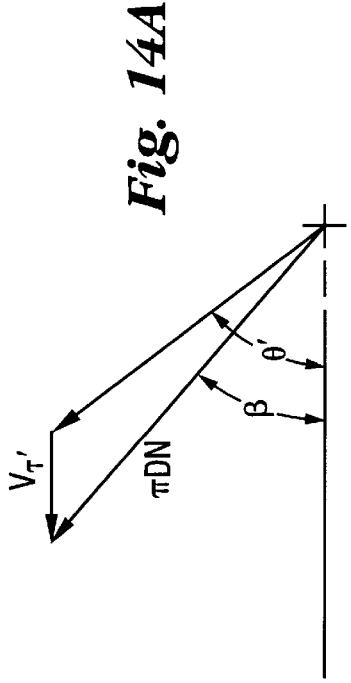
FIG. 14A is vector diagram showing derivation of a resultant angle between head-to-tape motion and tape edge for a second mode of the invention.

Equation 3 is used to determine the resultant angle θ' between head-to-tape motion and tape edge for the second mode of the invention. FIG. 14A is vector diagram showing derivation of a resultant angle θ' when the linear tape speed is $V_T'$. Parameters of Equation 3 have essentially the same meaning as in Equation 1, it further being understood that β is the helix angle and that $V_T'$ refers to the threshold linear tape speed.

Equation 3

$$\theta' = \tan^{-1}\frac{\pi DN\sin\beta}{\pi DN\cos\beta - V_T'}$$

In the particular embodiment of the second tape drive and second mode herein illustrated, D=46.9 mm; N=94.35386457 30 rev/sec; and β=4.8871 degrees.

Figure 14B:
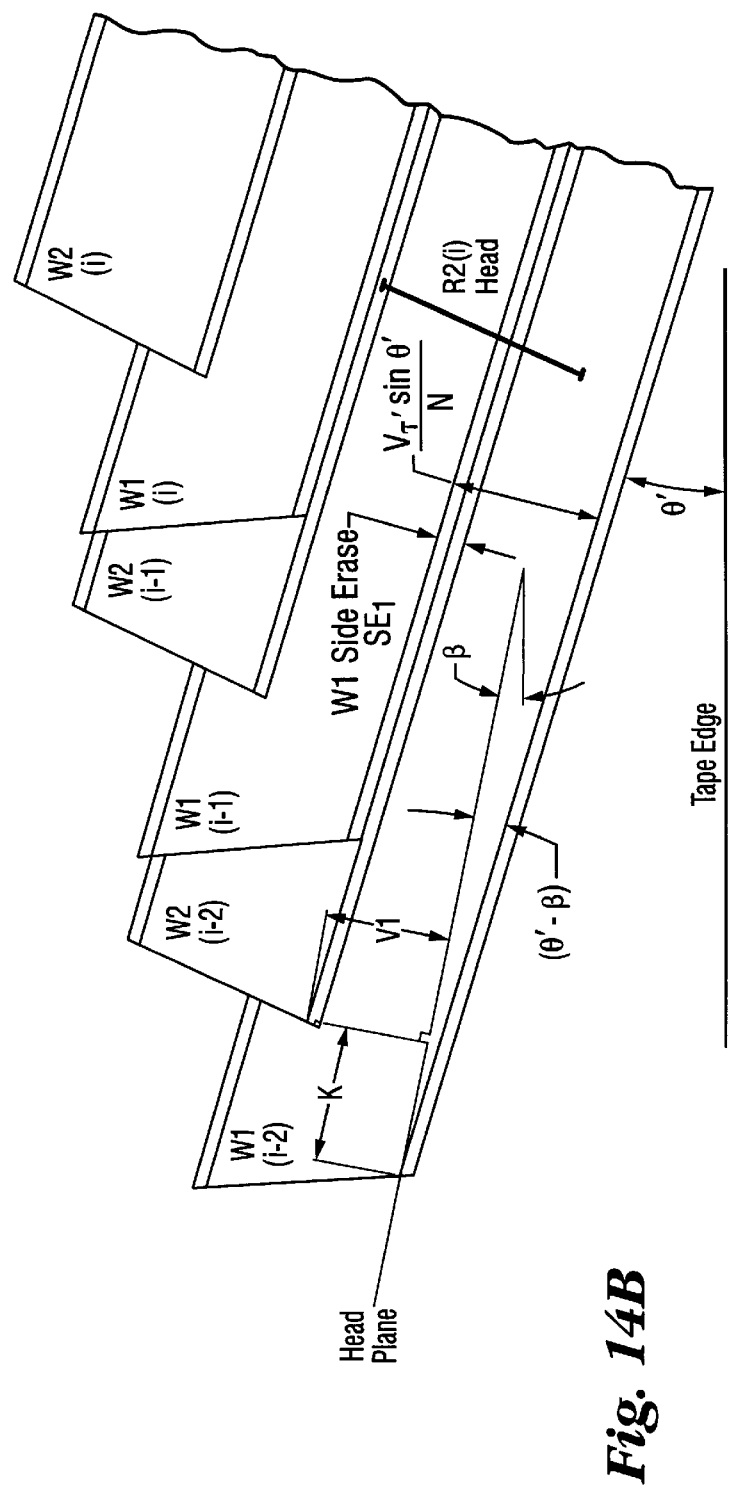
FIG. 14B diagram showing derivation of axial offset distance V1 for the second mode of the invention.

FIG. 14B shows a recorded track pattern corresponding to operation at the threshold linear tape speed—the lower edge of the fringing field (or side-erase area) from the W1 head is coincident with the lower edge of the W2 data track (which does not include the W2 side-erase area) that was recorded by the previous pass of the W2 head.

FIG. 14B also shows derivation of axial offset distance V1 (separating heads W1 and W2) for the second mode of the invention for the linear tape speed is $V_T'$. In addition, FIG. 14B shows parameters of Equation 4 which is utilized to determine V1. Upon determining the threshold linear tape speed $V_T'$, V1 can be determined directly from Equation 4.

Equation 4

$$V1 = \frac{\frac{V_T'}{N}\sin\theta' - K\{\sin(\theta' - \beta)\} - SE_1}{\cos(\theta' - \beta)}$$

In Equation 4, $SE_1$ is the side erase from head W1 and is approximately 0.001 mm; and K is given by Equation 5.

Equation 5

$$K = |\text{chords}|W2/W1 \text{ offset} = \frac{S1°\pi D}{360°} = \frac{(1.449°)\pi(46.9)}{360°}$$

The method of the present invention is particularly useful for verifying that the drum of a particular tape drive has a proper axial offset distance. This is especially important when setting up manufacturing operations for fabrication of the drums. Verification of axial offset distances for pilot run drums greatly assists in adjustment or calibration of the drum manufacturing procedures. Moreover, the present invention is useful for quality control checking of drums destined for helical scan tape drives.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A method of adjusting a vertical offset distance between a first write transducing element and a second write transducing element of a helical scan tape drive, the first write transducing element and the second write transducing element being adjustably positioned on a rotating drum of the helical scan tape drive, the first write transducing element having a first read transducing element paired therewith and the second write transducing element having a second read transducing element paired therewith, and wherein the method comprises the following steps:

setting a linear tape speed to a value at which tracks recorded by the second write transducing element are rendered unreadable by the second read transducing element by reason of the first write transducing element recording over the tracks recorded by the second write transducing element, and acquiring a noise signal from the second read transducing element;

varying the linear tape speed to a value at which tracks recorded by the second write transducing element are not rendered unreadable by the second read transducing element, and acquiring a non-noise signal from the second read transducing element; and determining a threshold linear tape speed at which the non-noise signal begins; and using the threshold linear tape speed to determine any vertical offset distance.

2. The method of claim 1, wherein the vertical offset distance V1 is determined by $$V1 = \frac{\frac{V'_T}{N}\sin\theta' - K\{\sin(\theta' - \beta)\} - SE_1}{\cos(\theta' - \beta)}$$

wherein:

$V_T'$ = the threshold linear tape speed;

D = an effective diameter of the drum;

N = a rotational rate of the drum;

$\beta$ = an angle between a head plane of the drum and a tape edge;

$\theta'$ = a resultant angle between a head-to-tape direction and the tape edge;

$SE_1$ = is a side erase from first write transducing element; and

K is a constant.

* * * * *